UNITED STATES PATENT OFFICE.

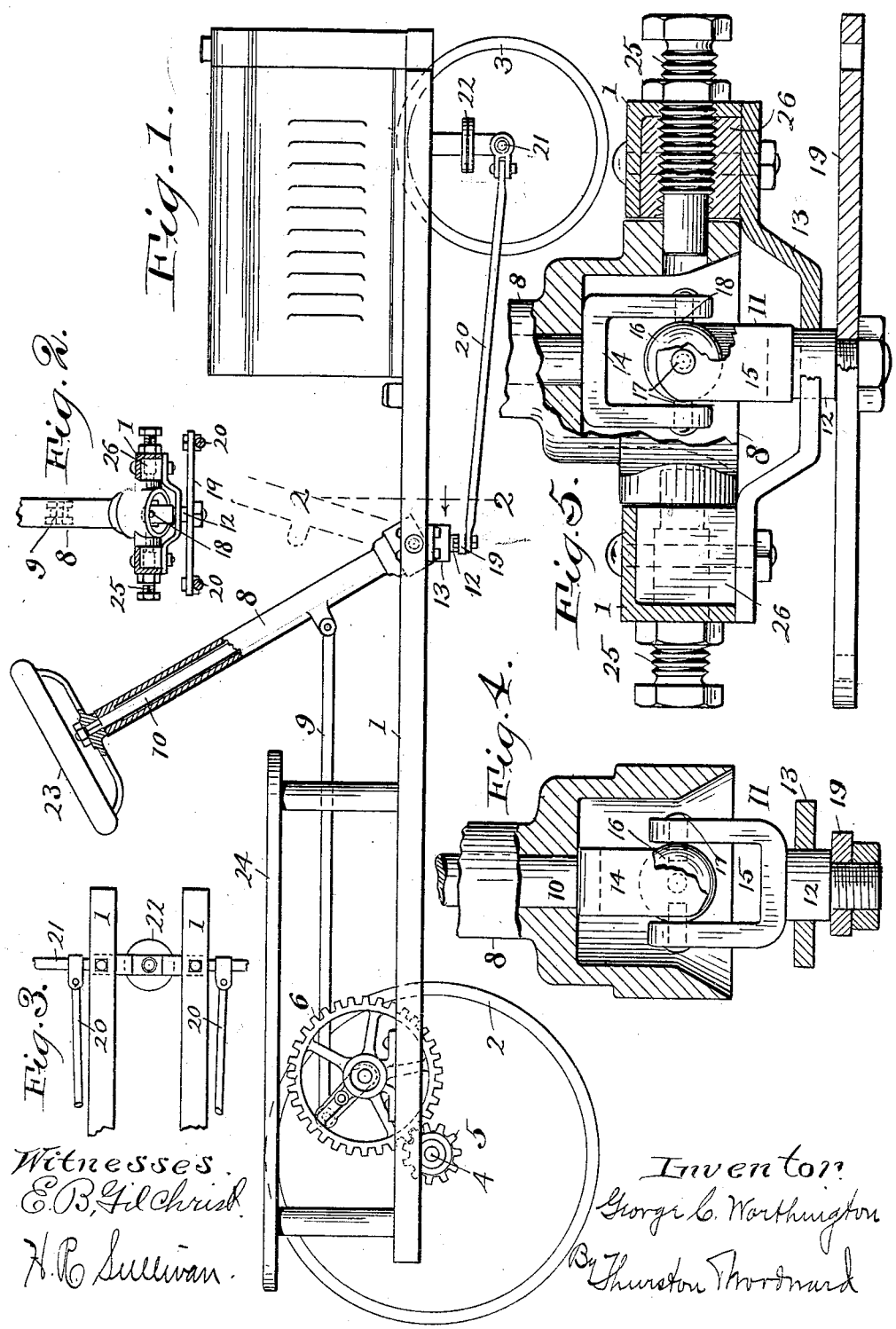

GEORGE C. WORTHINGTON, OF ELYRIA, OHIO, ASSIGNOR TO THE WORTHINGTON COMPANY, OF ELYRIA, OHIO, A CORPORATION OF OHIO.

VELOCIPEDE.

941,121.

Specification of Letters Patent.

Patented Nov. 23, 1909.

Application filed March 16, 1907. Serial No. 362,590.

*To all whom it may concern:*

Be it known that I, GEORGE C. WORTHINGTON, a citizen of the United States, residing at Elyria, in the county of Lorain and State of Ohio, have invented a certain new and useful Improvement in Velocipedes, of which the following is a full, clear, and exact description.

This invention consists in the combined steering and driving mechanism for a velocipede, substantially as shown in the drawings and hereinafter described and claimed.

In the drawing Figure 1 is a side elevation of a velocipede embodying the invention,—the tubular driving lever being partially sectioned. Fig. 2 is a front elevation of the lower end of the tubular driving lever, and associated parts, and a sectional view of the adjacent frame. Fig. 3 is a plan view of the front end of the frame and the middle part of the steering wheel's axle. Fig. 4 is an enlarged longitudinal sectional side view of the lower end of said driving lever and associated mechanism. Fig. 5 is a front elevation partly in section of the lower end of said driving lever and associated mechanism.

The velocipede frame may be of any suitable construction, but, as shown, it is composed of two parallel longitudinally extended bars 1, 1. It is provided with driving wheels 2, and steering wheels 3. The driving wheels are secured to the rear axle 4, which is mounted in suitable bearings carried by said frame. A pinion 5 is secured to the rear axle; and a gear 6, which meshes with pinion 5, is secured to a shaft 7 which is also mounted in suitable bearings on the frame.

The driving lever 8 is tubular. Its lower end, which is bell shaped, passes between two frame members 1, and is pivoted thereto on a horizontal axis. At a suitable distance above this pivot axis, a pitman 9 is pivotally connected to this lever; and the rear end of this pitman is connected with a crank on the gear 6. Except for the fact that the operating lever is tubular and essentially so, the mechanism thus far described is of familiar construction. A steering shaft section 10 passes down through this tubular lever, and its lower end, within the bell shaped lower end of said lever, is connected by a universal joint 11 with the steering shaft section 12, which is rotatably mounted in a bracket 13 secured to the frame members.

The universal joint referred to includes the fork 14 on the lower end of the steering shaft section 10, the fork 15 on the upper end of the steering shaft section 12, the intermediate piece 16, and the pivots 17 and 18 at right angles to each other, which connect said forks respectively with the intermediate piece 16. The axes of these pivots are in substantially the same plane with the axis upon which the driving lever 8 rocks. A bar 19 is secured to the lower end of the steering shaft; and this bar is connected by two steering rods 20 with the front axle 21 on opposite sides of the fifth wheel 22, through which said axle is connected with the front end of the velocipede frame. A steering wheel 23 is secured to the upper end of the steering column. The operator sits upon the seat 24, and, taking hold of this steering wheel, rocks the operating lever backward and forward, thereby turning the rear axle through the described intermediate mechanism driving the machine. To steer the velocipede the operator turns the steering wheel, as required. This, of course, turns the steering shaft section 10, and, through said universal joint, the steering shaft section 12,—the motion of this steering shaft section 12 being transmitted to the front axle through the bar 19 and steering rods 20. The pivots for the driving lever are the cylindrical inner ends of screws 25, which screw through blocks 26 rigidly attached to the frame members.

Having described my invention, I claim:

1. In a velocipede the combination of a frame which includes two longitudinal side bars, driving wheels mounted in bearings secured to said frame, steering wheels, a tubular operating lever, blocks secured to the side frame members, pins screwing through the side frame members and through said blocks and serving as pivots for said operating lever, mechanism transmitting motion from said lever to the driving wheels, a two-part steering shaft, a cross bar fixed to the frame members and serving as the bearing for the lower member of said steering shaft, the upper member of said steering shaft being rotatively mounted in said operating lever and projecting from the upper end thereof, a steering wheel secured on the upper end of said member and preventing its downward movement in said operating lever, a universal joint connection between the two members of the steering shaft, and means transmitting motion from the lower section of the steering shaft to the steering wheels.

2. In a velocipede, the combination of a frame which includes two longitudinal side bars, driving wheels mounted in bearings secured to said frame, steering wheels, a tubular operating lever projecting between the side members of the frame and pivotally connected therewith, mechanism transmitting motion from said lever to the driving wheels, a two part steering shaft, a cross bar fixed to the frame members and serving as the bearing for the lower member of said steering shaft, the upper member of said steering shaft being rotatively mounted in said operating lever and projecting from the upper end thereof, a steering device secured to the upper end of said member, a universal joint connection between the two members of the steering shaft, the axes of said universal joint being in the same plane with the axis of the pivotal support for the operating lever, and means transmitting motion from the lower section of the steering shaft to the steering wheels.

In testimony whereof, I hereunto affix my signature in the presence of two witnesses.

GEORGE C. WORTHINGTON.

Witnesses:
S. M. MOORE,
JNO. T. DISMUKES.